Aug. 7, 1945.  L. L. THOMPSON  2,381,627
FILTER
Filed Sept. 29, 1942

Lonnie L. Thompson
INVENTOR.

BY
ATTORNEY.

Patented Aug. 7, 1945

2,381,627

UNITED STATES PATENT OFFICE 2,381,627

FILTER

Lonnie L. Thompson, Iowa Park, Tex.

Application September 29, 1942, Serial No. 460,153

3 Claims. (Cl. 210—131)

This invention relates to improvements in filters, and particularly to maintain a continuous supply of purified oil free of impurities and in condition for use in the engine.

In internal combustion engines to which lubricating oil must be supplied in a continuous cycle, this oil becomes contaminated readily. It has therefore, been desirable to connect a filter unit with the lubricating system, so that the oil from the force pump of the engine will be continuously filtered during the process while being forced through the system, and so maintain a constant supply of clean lubricating oil therefor during the operation of the engine.

Various attempts have been made to provide such a filter that would satisfy the demand for a simple, and inexpensive construction which utilizes an inexpensive, renewable filter charge, but, due to their expensiveness and the difficulty with which the charges were replaced therein, such filter have not met with public approval.

The object of this invention is to provide a filter for lubricating oils and the like to be used in connection with an engine, which is inexpensive to construct, easy to clean or renew the filter charge without waste of vital material, and without shutting down the engine with which it is connected.

Although this invention has been designated as a filter for the lubricating oil of an internal combustion engine, it is not limited to that application, and may be adapted readily to other uses. This filter may be disassembled readily for cleaning or for replacing the filter element when the effectiveness of the unit has become impaired because of impurities filtered from the oil.

A preferred embodiment of my invention is illustrated in the accompanying drawing, in which.

Figure 1:
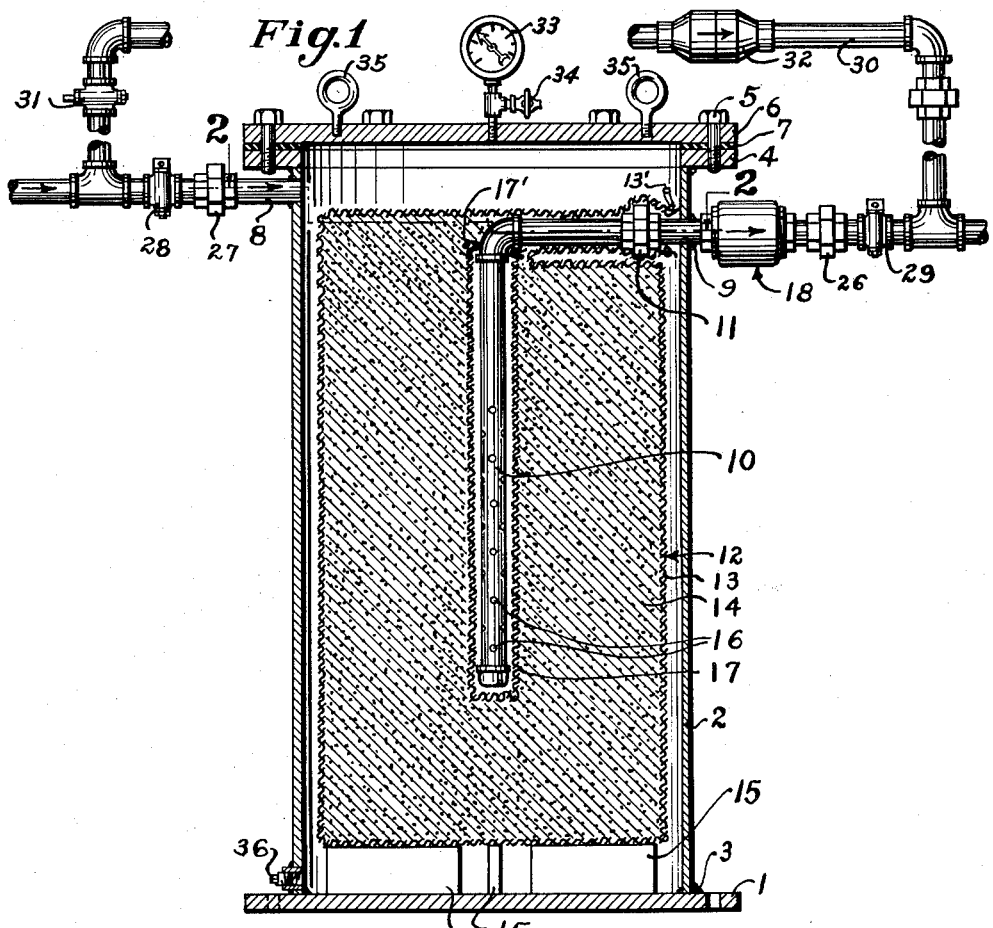
Fig. 1 is a vertical sectional view through the filter and showing connections for oil lines leading to and from an internal combustion engine.
Figure 2:
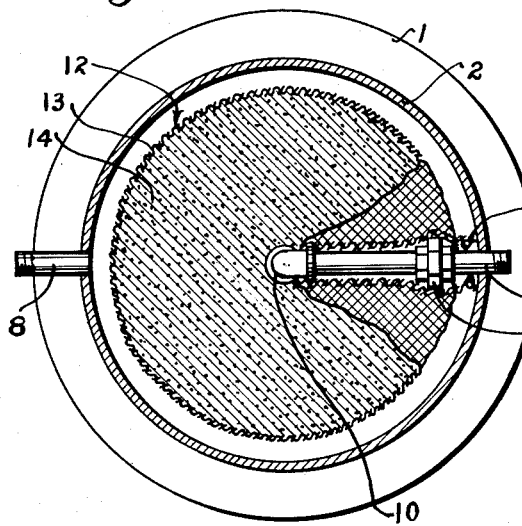
Fig. 2 is a horizontal section, taken on the line 2—2 of Fig. 1.
Figure 3:
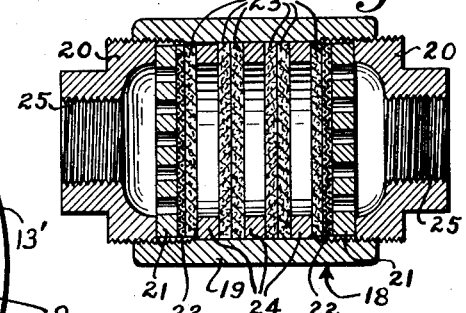
Fig. 3 is an enlarged section of the final or secondary portion of the filter unit, detached.

With more particular reference to the drawing, the numeral 1 designates the filter base which is preferably circular in shape and has an upstanding cylindrical shell 2 thereon and welded or otherwise secured thereto as indicated at 3. A flange 4 is similarly secured to the upper end of the shell 2 and has holes circumferentially spaced therearound to receive bolts 5 which secure the head 6 thereto. A gasket 7 is interposed between the head 6 and the flange 4 so as to form a pressure tight joint.

An inlet pipe 8 is secured to a side of the shell 2 for introducing the oil to be filtered therein. An outlet pipe 9 passes through the wall of the shell 2 and is connected with a perforated pipe 10 by a union 11. The perforated pipe 10 is suspended axially within the shell 2 and within a filter cartridge 12.

The filter cartridge 12 comprises an outer bag or reticulated receptacle 13, and a filtering medium, such as fuller's earth 14. The filter medium 14 fills the bag or receptacle 13, which is preferably made of heavy canvas material, and has a circular bottom which seats on upstanding bars 15 which hold the bottom of the bag 13 spaced above the base 1. The bag 13 is of smaller diameter than the inside of the shell 2, so as to permit free circulation of the incoming oil around as well as above and below the filter cartridge 12.

Perforations 16 in the pipe 10 are covered by a slender tubular bag 17 of the same material as the bag 13, which prevents the filter medium 14 from passing out through the pipes 9 and 10.

A final filter unit 18 is positioned within the pipe line 9, outside of the filter shell 2, and is utilized to extract any minute particles of filter medium or foreign matter which may have passed through the canvas bag 13 within the filter cartridge 12. The filter unit 18 is so constructed as to permit ready installation and removal within the line 9, when it is desirable to install a replacement unit. Furthermore, the construction is such that the filtering elements may be removed and washed in a cleansing agent and reinstalled, and thus give satisfactory service over an extended period of time, before a new unit becomes necessary.

The filter unit 18 comprises a cylindrical body 19 having heads 20 at either end thereof, which heads are internally threaded for connection with the pipe 9 and externally threaded to be screwed into opposite ends of the body 19 for compression engagement with perforated plates 21 within said body 19. Between the perforated plates 21 is a series of filter mediums consisting of fine-gauge mesh screens 22 and felts 23, with spacing rings 24 interposed between pairs of the felts 23. The inner felts 23 are preferably of double thickness and are held in place under compression by the rings 24 and the screw pressure of the heads 20 with the body 19.

A union 26 is provided in the pipe 9 to permit ready removal of the filter unit 18, and a similar union 27 is provided in the pipe 8. Valves 28 and 29 are provided also in the pipes 8 and 9. When these valves are closed, the unions 26 and 27 may be disconnected, and the entire filter removed. A by-pass line 30 may be provided between the pipes 8 and 9 around the filter, having a valve 31 therein (shown in closed position), which valve may be opened and the oil by-passed therethrough. This would allow the filter unit to be changed or cleansed without the necessity of shutting down the engine. An automatic pressure relief valve 32 may be provided in the line 30, and with the valve 31 in open position and valves 28 and 29 open, the oil may be by-passed automatically, if the filter should become clogged while an attendant is not in charge.

It is desirable to have a pressure gauge 33 in order to determine the pressure on the filter at all times. The pressure is indicative of the condition of the filter, as a filter which has become clogged is more resistant to the flow of oil therethrough, and therefore an increase of pressure is shown on the gauge.

In installing new filters, or in recharging the filter material in the filter, air becomes intermixed with the material and, due to the construction of the filter, cannot escape. Since this incorporated air reduces the effectiveness of the filter, a petcock 34 is provided within the upper portion of the shell 2 for releasing the air or vapor within the shell, so that the oil will completely saturate the filter material 14.

The perforations 16 are spaced along the pipe 10, downward from the top and upward from the bottom of the filter cartridge, a distance substantially equal to the radial distance through the filter cartridge. The oil will, therefore, have to travel a distance equal to the radial distance of the filter cartridge to reach any of the outlet holes. This will insure the desired filtration.

For installing the filter, unions 26 and 27 are provided for the pipes 8 and 9, so that the filter may be set in place and connected therewith. In use, the pipe 8 will conduct the incoming oil, as indicated by the arrow, into the top of the shell 2; thence around and below the filter cartridge 12; through the heavy canvas bag 13, straining out the coarse particles of foreign matter such as carbon granules and the like which will drop to the bottom compartment and may be removed through a drain; thence through the fuller's earth 14, which substantially removes the carbon and other particles of foreign matter from the oil by the time it reaches the inner canvas tube 17 which is secured to the pipe by a cord 17'. The purpose of this tube 17 is to retain the filter medium within the bag 13 while permitting the oil to pass through perforations 16 and outward through the pipe 9, into secondary filter unit 18.

This secondary filter unit 18 comprises the arrangement of perforated plates 21, screen wire 22, and felts 23. The oil is permitted to enter this filter unit 18 through the perforated plate 21 at one end of the filter, passing through the screen 22 then through a single felt 23 into the chamber formed within the spacing ring 24. The oil will spread out over the entire surface of the double felts on the opposite side of this and each subsequent chamber until it passes through the final single felt 23 and screen 22 and outward through perforated plate 21 at the outlet end of the unit. It will be evident that screen 22 will screen out the larger particles of foreign matter, and the felt will remove any filter material which may have become entrained in the oil or which was not removed by the filter 12. As the oil progresses through each of the series of felts, it is further purified, and upon reaching the final screen 22, any particles of felt fiber are screened from the oil before it passes to the oil reservoir in the engine. Due to the pump pressure thereon, such fine gauge mesh screen might be broken and bulged during the circulation and filtration of the oil; therefore, the perforated plate 21 has been provided to reinforce the screen mesh.

With the valve 31, in the by-pass line 30, open and the relief valve 32 set to open at the maximum working pressure at which the filter will operate effectively, the oil will be by-passed around the filter without being filtered, until the filter can be renewed or cleaned. To renew the filter medium within the shell 2, valve 31 is opened and valves 28 and 29 are closed. This will cause the oil to by-pass through the pipe 30 during the renewing or cleaning process, in event it is desired to continue to operate the engine without interruption.

The bolts 5 are then removed so the head 6 may be lifted from the top of the cylinder by means of eye bolts 35 and the cord 13' is loosened from around pipe 9 thus giving access to union 11. As the union is disconnected, the bag 13 which contains the fuller's earth 14, and the pipe 10, are lifted from the shell 2. A new bag can be placed then within the shell. A new tubular bag 17 may be placed over the pipe 10, which is taken from the old filter unit, and is secured thereto by the cord 17'. The union 11 is reconnected to the pipe 9. Fuller's earth may be poured into bag 13 until it reaches the desired level, as shown in Fig. 1. The mouth of the bag 13 is then secured around pipe 9 by the cord 13', and the cover 6 and bolts 5 are replaced. Then the primary filtering unit is again ready for service with a minimum of time, effort and new materials.

It will be noted that the pipes 8 and 9 are connected near the top of the shell 2, and therefore, the oil within the shell is not lost during changing of the filter cartridges. However, if desirable, the oil may be drained from the shell by removing a plug 36 in an opening in a side of the shell near the bottom, which plugged opening may be used also to drain sediment from the bottom of the filter. The bars 15 are spaced from the walls to permit the sludge and sediment to drain freely from the bottom of the shell.

If desired, the fuller's earth and the pipe 10 may be placed in the bag 13 before it is replaced in the shell and reconnected. It would thus serve as a replaceable cartridge in the event the user did not wish to purchase his materials in bulk for refilling his own filter.

By removing one of the heads 20 of the secondary filter unit 18, the screens 22 and felts 23 may be removed therefrom and cleaned, or new material may be substituted for the clogged felts and screens and the unit reassembled in the manner as hereinbefore set forth.

The cartridge for this filter need not be encased in a metallic case before its insertion into the cylinder, and therefore much metal is saved, or which may not be obtainable. Any tough, porous, fibrous material may be used instead of the canvas for parts 13 and 17 if desired.

The unit, as shown, is typical of large industrial engine installations, such as power houses and the like, where constant service must be maintained. However, the invention is not limited to any particular sized installation or use on any particular type of engine, or application, but may be used wherever found suitable for the filtering of impurities from liquids.

I claim:

1. A filter comprising an enclosed shell having surrounding wall and bottom, and a head seated upon the surrounding wall, means for detachably securing the head to the surrounding wall, a filter cartridge disposed within the shell and comprising a fabric container enclosing a filter medium, a pipe having a perforated portion enclosed within the filter medium in the shell and having an upper end extending outwardly from the cartridge, said shell having a fluid inlet, a fluid outlet pipe extending through the wall of the shell below the head and adjacent the top of the shell, and a coupling within the shell detachably connecting said outlet pipe with the upper end of the first-mentioned pipe whereby said first-mentioned pipe and cartridge may be removed from the shell upon disconnection of the head.

2. A filter comprising an enclosed shell having a surrounding wall and bottom, a head detachably secured to the upper portion of the surrounding wall, a filter cartridge within the shell, a pipe enclosed within the filter cartridge in the shell and having an upper end outside the filter cartridge within the shell, a fluid pipe extending through the surrounding wall of the shell below the head, and a coupling within the shell detachably connecting said fluid pipe with the upper end of the first-mentioned pipe, whereby said first-mentioned pipe and the cartridge may be detached and removed from the shell after disconnection of the head from said shell.

3. A filter comprising an enclosed shell having surrounding wall and bottom, and a head seated upon the surrounding wall, means for detachably securing the head to the surrounding wall, a filter cartridge disposed within the shell and comprising a fabric container enclosing a filter medium, a pipe having a perforated portion enclosed within the filter medium in the shell and having an upper end extending outwardly from the cartridge, said shell having a fluid inlet, a fluid outlet pipe extending through the wall of the shell below the head and adjacent the top of the shell, and a coupling within the shell detachably connecting said outlet pipe with the upper end of the first-mentioned pipe, whereby said first-mentioned pipe and cartridge may be removed from the shell upon disconnection of the head, said fabric container having a mouth portion extending over the fluid pipe to a point between the coupling and the adjacent portion of the shell, and means for securing said mouth portion on the pipe between said portion of the shell and the coupling to prevent the force of the fluid from disturbing the position of the mouth portion relative thereto.

LONNIE L. THOMPSON.